O. C. BROOKS.
BELT FASTENER.
APPLICATION FILED MAY 18, 1917.

1,250,958.

Patented Dec. 25, 1917.

Oliver C. Brooks
Inventor

By Baldwin & Wight
his Attorneys

UNITED STATES PATENT OFFICE.

OLIVER C. BROOKS, OF BALTIMORE, MARYLAND, ASSIGNOR TO INTERNATIONAL CONVEYOR CORPORATION, OF NEW YORK, N. Y.

BELT-FASTENER.

1,250,958.　　　　　　　Specification of Letters Patent.　　Patented Dec. 25, 1917.

Application filed May 18, 1917. Serial No. 169,521.

*To all whom it may concern:*

Be it known that I, OLIVER C. BROOKS, a citizen of the United States, residing at Baltimore city, in the State of Maryland, have invented certain new and useful Improvements in Belt-Fasteners, of which the following is a specification.

My object is to provide an improvement in belt fasteners which, while insuring an effective and strong union, will be flexible to permit of bending in various directions.

Figure 1:
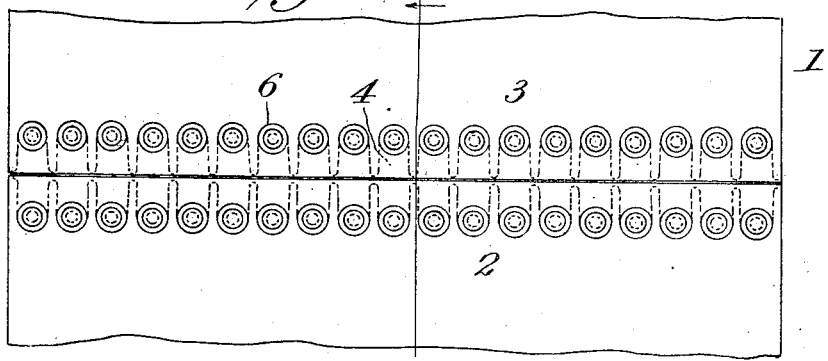
Figure 2:
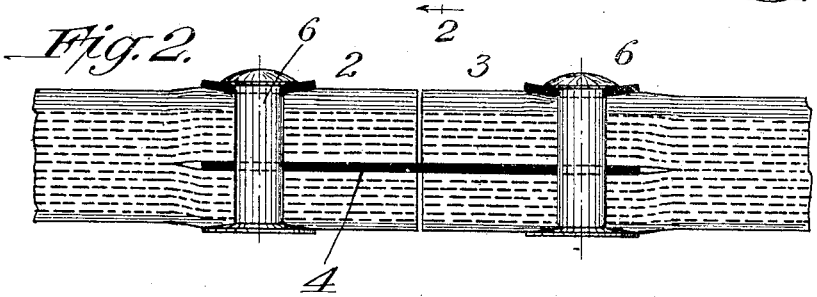
Figure 3:
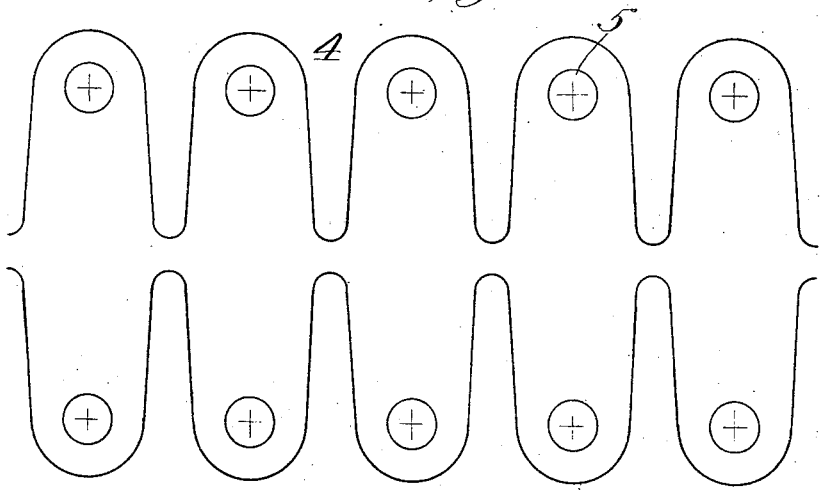

As shown in the accompanying drawing, Figure 1 is a plan view; Fig. 2 a section on line 2—2, Fig. 1; and Fig. 3 a detail of the plate.

As illustrated the belt 1 has contiguous edges 2 and 3. Each of these edges is split longitudinally within its thickness to form two or more layers of material.

A metal plate 4 is placed within the split portions of the material. It is formed with holes 5. Rivets 6 may pass through the layers of the material and the holes in the plate.

The plate 4 is of peculiar construction. It is clearly illustrated in Fig. 3. It is formed with serrated edges so that the extended portions may be fastened to the belt edges while the intermediate notches permit of bending, thus insuring a firm but flexible joint.

I claim as my invention:

1. Belt fastening means comprising contiguous belt ends split longitudinally within their thicknesses to form layers of material, a metal plate having serrated ends inserted between the layers, and means engaging the serrated ends within the belt for fastening the plate to the layers.

2. Belt fastening means comprising contiguous belt ends split longitudinally within their thicknesses to form layers of material, a serrated metal plate formed with holes and inserted between the layers, and rivets passed through the material and the holes in the plate.

In testimony whereof, I have hereunto subscribed my name.

OLIVER C. BROOKS.

Copies of this patent may be obtained for five cents each, by addressing the "Commissioner of Patents, Washington, D. C."